(12) United States Patent
Kataoka et al.

(10) Patent No.: US 7,608,959 B2
(45) Date of Patent: Oct. 27, 2009

(54) BRUSHLESS MOTOR

(75) Inventors: Nakaba Kataoka, Kyoto (JP); Keita Nakanishi, Kyoto (JP); Yoshiaki Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 369 days.

(21) Appl. No.: 11/551,239

(22) Filed: Oct. 20, 2006

(65) Prior Publication Data

US 2007/0090717 A1    Apr. 26, 2007

(30) Foreign Application Priority Data

Oct. 21, 2005   (JP)   ............... 2005-306620

(51) Int. Cl.
  *H02K 5/00*   (2006.01)
(52) U.S. Cl. ..................... 310/91; 310/194
(58) Field of Classification Search ............ 310/51, 310/67 R, 68 B, 89, 91, 194
  See application file for complete search history.

(56) References Cited

U.S. PATENT DOCUMENTS

| 5,287,030 A | * | 2/1994 | Nutter | ............... | 310/89 |
| 6,750,574 B2 | * | 6/2004 | Okazaki et al. | ............... | 310/68 B |
| 7,030,525 B2 | * | 4/2006 | Fujishima et al. | ............... | 310/89 |
| 7,042,124 B2 | * | 5/2006 | Puterbaugh et al. | ............... | 310/89 |
| 2002/0175574 A1 | * | 11/2002 | Okazaki et al. | ............... | 310/68 B |

FOREIGN PATENT DOCUMENTS

| EP | 0 240 644 A1 | 10/1987 |
| JP | 2002-101606 A | 4/2002 |
| JP | 2004-096923 A | 3/2004 |

* cited by examiner

*Primary Examiner*—Tran N Nguyen
(74) *Attorney, Agent, or Firm*—Keating & Bennett, LLP

(57) ABSTRACT

In an armature for a brushless motor, a gap is provided between an inner circumferential surface of a cylinder portion of a cover and an outer circumferential surface in a radial direction of the armature. A plurality of non-magnetic spacers having a predetermined distance therebetween are provided in a circumferential direction so as to make contact with the inner circumferential surface of the cylinder portion and the outer circumferential surface of the armature.

31 Claims, 12 Drawing Sheets

BRUSHLESS MOTOR

BACKGROUND OF THE INVENTION

1. Technical Field

The present invention relates to a brushless motor, particularly to a brushless motor designed to have reduced vibration energy and reduced torque loss.

2. Description of the Related Art

A conventional structure of a brushless motor (hereinafter, referred to as a "motor") allows vibration energy, generated by a reaction of a field magnet of an armature, to be conducted through an armature retaining member such as a motor case in which the armature is retained. Consequently, the vibration energy is conducted through the armature retaining member and to the entire motor. Particularly, in a Power Electric-Assist System (hereinafter, referred to as "EPS") in which steering of a vehicle operated by a driver is assisted by a motor, the vibration energy generated within the motor will be conducted to a handle of the vehicle, and thus, affecting the operability of the vehicle. In order to counter such vibration energy affecting the operability of the vehicle, a motor structure in which an annular spacer is circumferentially provided between the armature and the armature retaining member has been used.

However, since the spacer is circumferentially provided, a large area where the spacer and the armature retaining member make contact with each other will be generated. Therefore, the vibration energy of the armature will be conducted to the armature retaining member through a large area. This causes large vibration energy to be conducted from the spacer to the armature retaining member, thereby causing large vibration energy to be conducted within the motor. Therefore, there is an increased demand for a motor which generates smaller vibration energy than what is conventionally offered.

BRIEF SUMMARY OF THE INVENTION

The present invention relates to the relation with respect to the connection between a cylinder portion of a cover and an armature which is contained inside the cylinder portion. A plurality of spacers having a predetermined distance therebetween are provided in a circumferential direction between an inner surface of the cylinder portion and an outer surface of the armature, thereby generating a gap at a portion between the inner surface of the cylinder portion and the outer surface of the armature along a central axis as a rotary central axis. The spacers make contact with the outer surface of the armature and the inner surface of the cylinder portion. Since the spacers make contact with the cylinder portion and the armature, vibration energy generated in the armature will be conducted to the cover through the spacers, thereby reducing the amount of vibration to be conducted to the cover. By this, the vibration energy to be conducted externally from a motor containing the armature and the cover will be reduced.

Also, the spacers can be formed integrally with an insulator which covers lateral sides with respect to along the central axis a plurality of teeth portions attached to an armature core of the armature. Also, the spacers can be formed integrally with an armature contact portion located along the central axis with respect to the armature, wherein the armature contact portion connects end portions of the coil wound around the armature. With such configuration, in which the spacers are provided integrally with another component as described above, the number of components required for assembling the motor can be reduced.

Also, the inner surface of the cylinder portion of the cover and the outer surface of the armature make contact with each other. Therefore, a center of the inner surface of the cylinder portion and the center of the armature can be synchronized. The center of the armature, the center of the inner surface of the cylinder portion, and the central axis can be synchronized. By this, the amount of vibration energy generated by the armature can be reduced. Since the gap will be provided between the inner surface of the cylinder portion and the outer surface of the armature, the amount of the vibration energy conducted to the cylinder portion will be reduced.

DETAILED DESCRIPTION OF THE INVENTION

Motor Structure: Inner Rotor Type

Figure 1:
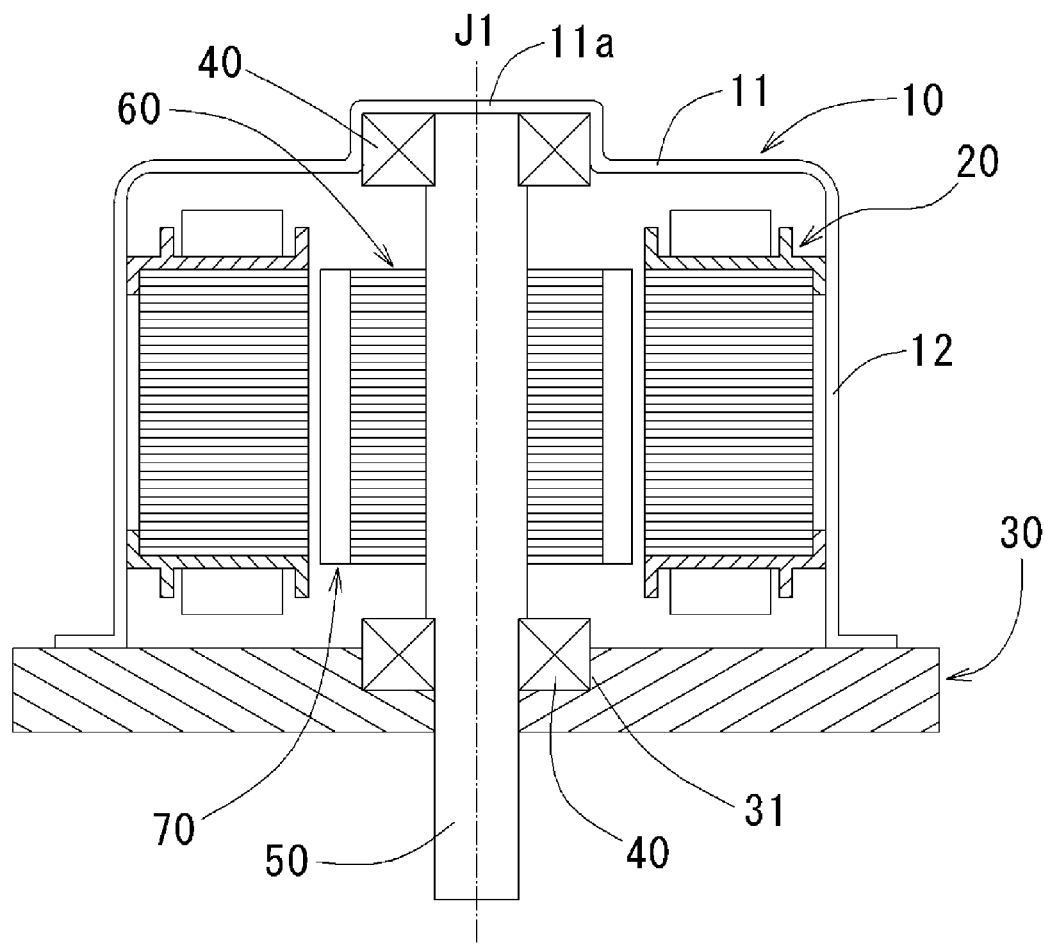
FIG. 1 is a cross sectional view along an axial direction of an embodiment of a motor according to the present invention.

An entire structure of an embodiment of a motor according to the present invention will be described with reference to FIG. 1. FIG. 1 is a schematic cross sectional view of the motor. Note that in the description of the present invention herein, words such as upper, lower, left, right, upward, downward, top, and bottom for describing positional relationships between respective members and directions merely indicate positional relations and directions in the drawings. Such words do not indicate positional relationships and directions of the members mounted in an actual device.

A cover 10 has a cylindrical shape having an opening at the bottom thereof. The cover 10 is formed on an iron base plate by applying thereon a process such as pressing. At a center of a bottom surface portion 11 located on an upper portion of the cover 10, an upper side indented portion 11a which faces upward is formed. Also, an armature 20 is positioned on an inner circumferential surface of a cylinder portion 12 inside the cover 10.

A bracket 30 is located on a surface of an opening portion of the cover 10, wherein the bracket 30 makes contact with the cover 10 so as to seal the opening portion. Also, a lower side indented portion 31 which is indented downward is formed near a central axis J1 of the bracket 30.

A ball bearing 40 as a bearing portion is affixed to an inner circumferential surface of the upper side indented portion 11$a$ and to an inner circumferential surface of the lower side indented portion 31. Although the present embodiment assumes the ball bearing 40, which is a rolling bearing, for the bearing thereof, an oil retaining sintered bearing, which is a sliding bearing, can be used.

In the ball bearing 40, a shaft 50 which is an output axis is affixed to the central axis J1 which is a rotary central axis such that the shaft 50 will be rotatably supported. On a center portion in the axial direction of the shaft 50, a rotor core 60, which includes a plurality of thin magnetic plates laminated on top of another, is affixed opposing to the armature in a radial direction. Further, a field magnet 70 is affixed to an outer circumferential surface of the rotor core 60 so as to generate a rotary drive force. The field magnet 70 and the armature 20 having a gap therebetween in the radial direction are opposed to each other. Then, when an electric current is applied to the armature 20, a magnetic field is generated around the armature 20 thereby generating, due to an interaction between the generated magnetic field and the field magnet 70, a rotary torque centering the central axis J1.

Clamping Mechanism for Armature and Cover

FIRST EMBODIMENT

Figure 2:
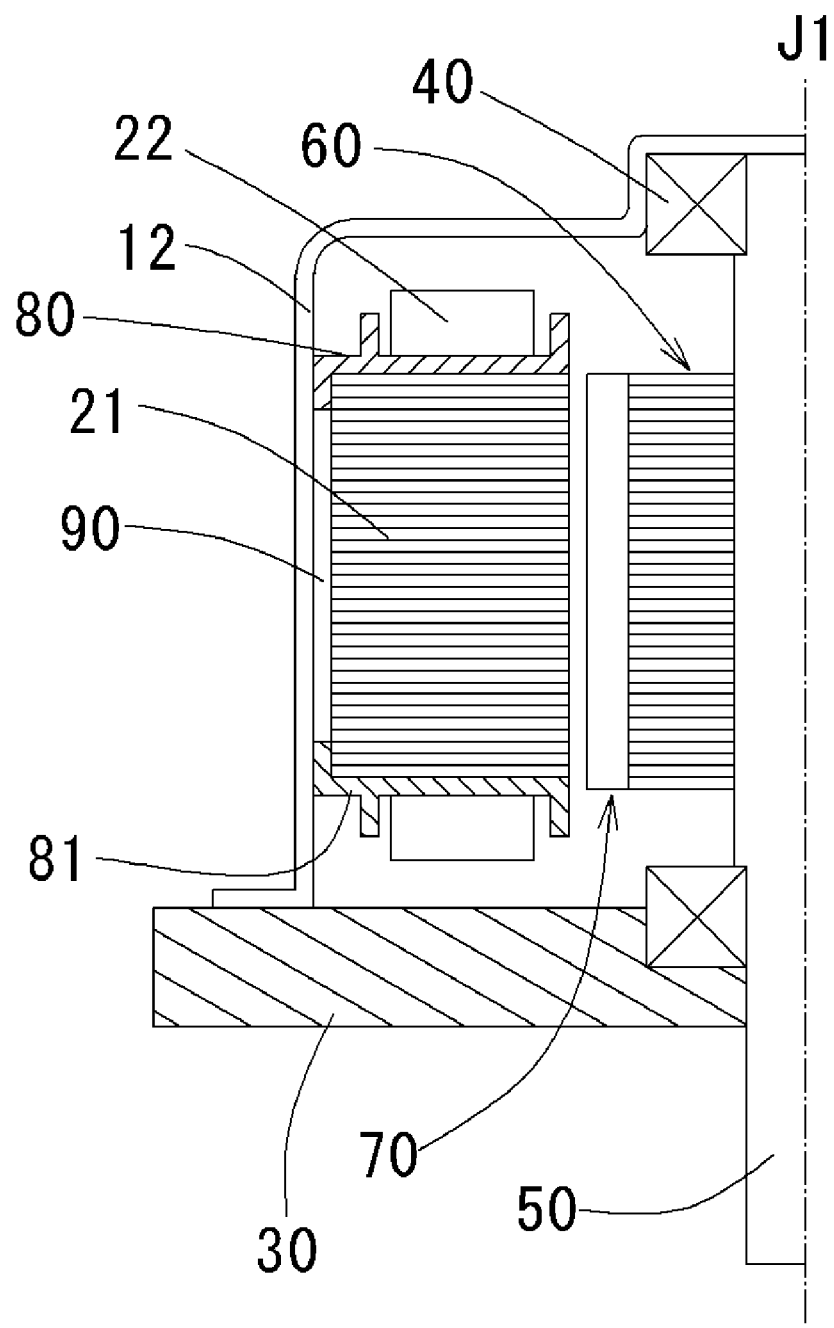
FIG. 2 is a half of the cross sectional view shown in FIG. 1 for showing the relation between an armature and a cover.
Figure 3:
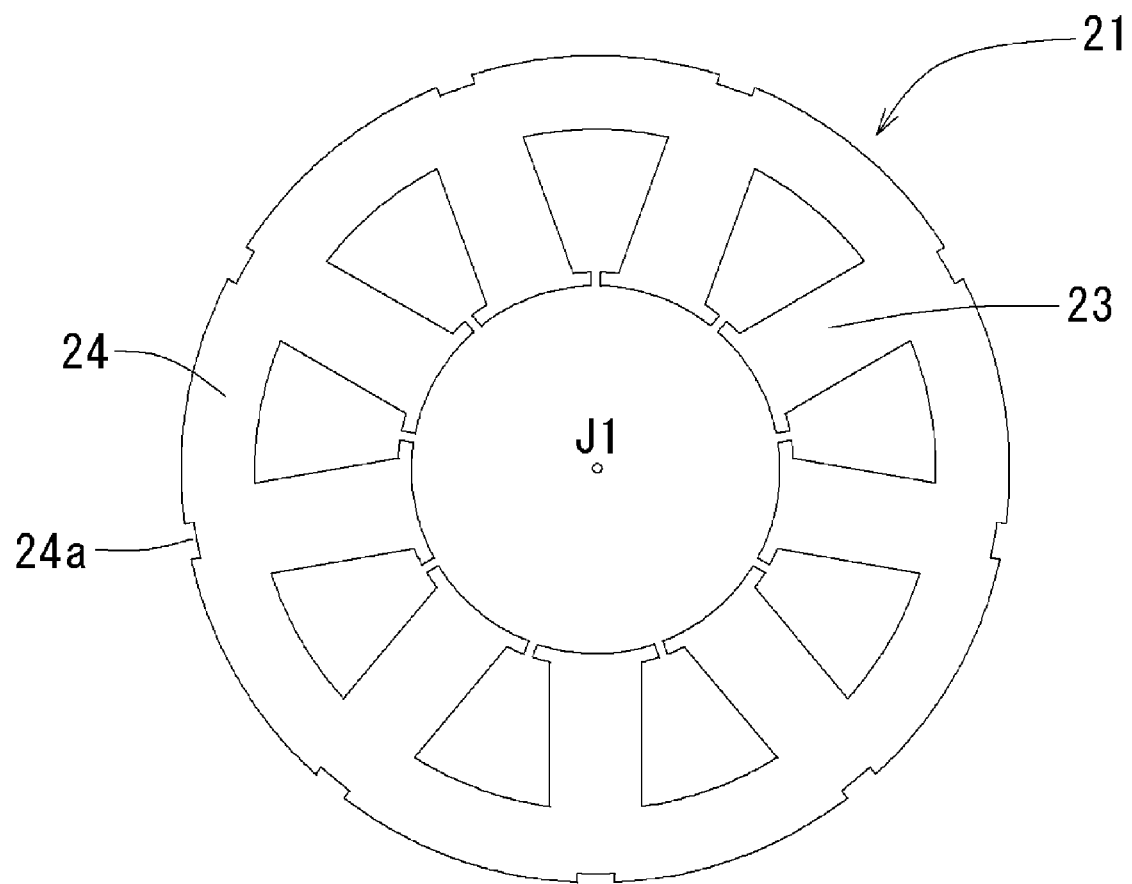
FIG. 3 is a top view showing a portion of an armature core.
Figure 4:
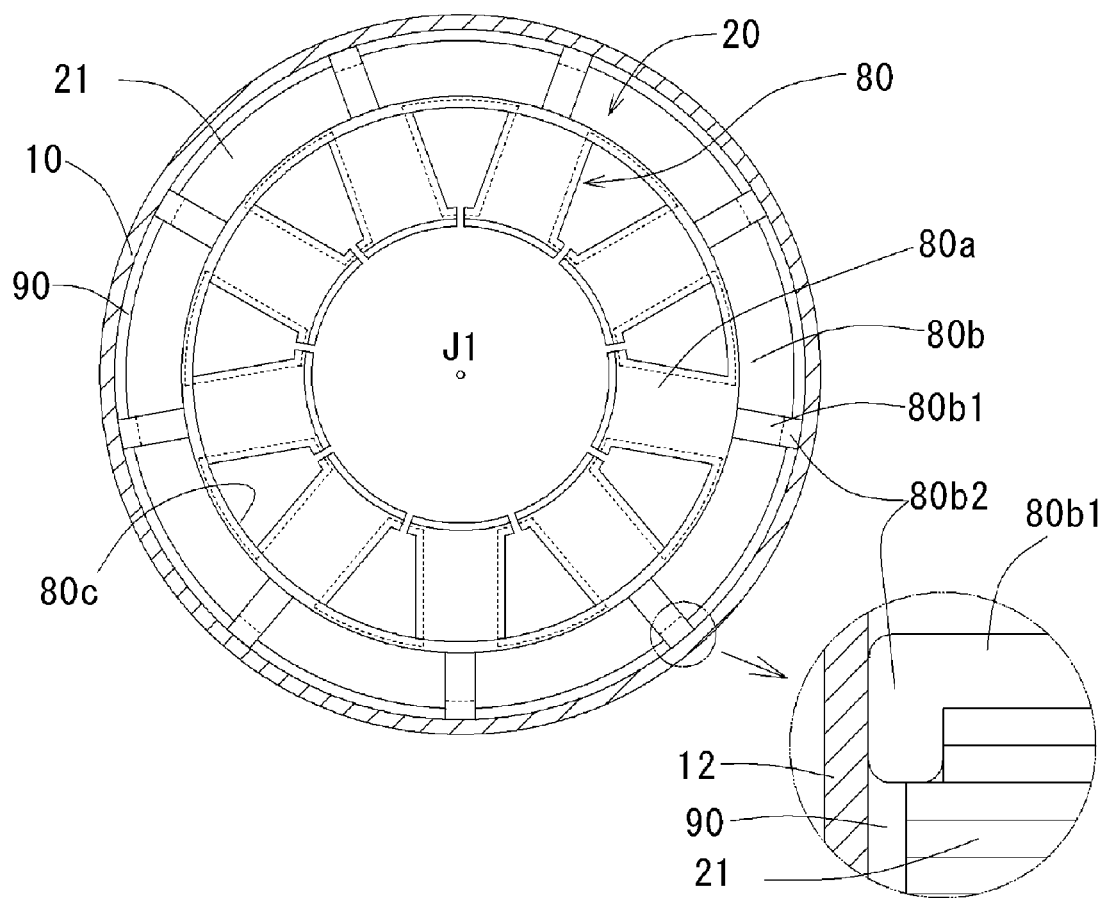
FIG. 4 is a top view showing the armature core having loaded thereon an insulator.

Next a first embodiment of a clamping mechanism for the armature 20 and the cover 10 will be described with reference to FIGS. 2 through 4. FIG. 2 is a half of a cross sectional view of FIG. 1. FIG. 3 is a top view showing an armature core 21 which will be described below. FIG. 4 is a top view showing the armature core 21 affixed to the cover 10 wherein the armature 21 has attached thereon an upper side insulator 80. Further, dotted lines in FIG. 4 show the armature core 21. A window indicated by a two-dot chain line attached to FIG. 4 is a view of a portion enlarged in the axial direction showing how the armature 20 and the upper side insulator 80 are attached to each other.

According to FIG. 2, the annularly formed armature 20 includes: an armature core 21 which is formed by a plurality of thin magnetic steel sheets laminated on top of another; the upper side insulator 80 and a lower side insulator 81 which are respectively attached to corresponding ends of the armature core 21 in the axial direction for insulating the armature core 21; and a wound wire 22 winding the upper side insulator 80 and the lower side insulator 81.

According to FIG. 3, the armature core 21 is located radially outside of a plurality of teeth portions 23 and includes a core back portion 24 connecting each tooth portion 23 which extends radially toward the central axis J1.

According to FIG. 4, the upper side insulator 80 includes: a tooth covering portion 80$a$ which covers an upper surface and both lateral surfaces of each tooth portion 23; an annular shaped core back upper side covering portion 80$b$ which covers a radially inner surface of the core back portion 24; and a core back side covering portion 80$c$ which covers inner circumferential surface of the core back portion 24. A radial direction outer side extending portion 80$b$1 is formed on a portion of an outer circumferential edge of the core back upper side covering portion 80$b$. Also, an axial direction extending portion 80$b$2 is formed on an outer circumferential edge of the radial direction outer side extending portion 80$b$1, wherein the axial direction extending portion 80$b$2 extends toward a lower side of the axis while making contact with an outer circumference of the core back 24. The axial direction extending portion 80$b$2 makes contact with the inner circumferential surface of the cylinder portion 12 so as to affix the armature 20 at a predetermined position. Also, a direct contact between the armature 20 and the bar 10 can be prevented since the upper side insulator 80 and the lower side insulator 81 are sandwiched between the armature 20 and the cover 10, where only the inner circumferential surface of the cover 10 and the axial direction extending portion 80$b$2 make contact with each other. That is, a gap 90 will be provided between the armature 20 and the cover 10. Consequently a magnetic flux leakage to the cover 10 can be prevented since only a small amount of a magnetic flux of the armature 20 will be attracted to the gap 90 having a large magnetic resistance, particularly when the cover 10 is composed of magnetic materials. By this, magnetic loss will be prevented in the motor, thereby reducing the torque loss. Further, according to FIG. 4, the axial direction extending portion 80$b$2 is provided such that the gap 90 is provided in the axial direction. Therefore, a contact area between the cover 10 and the armature 20 will become smaller, thereby reducing the amount of vibration energy conducted from the armature 20 to the cover 10. Furthermore, the upper side insulator 80 and the lower side insulator 81 are non-magnetic members and are composed of materials such as resin having elasticity, therefore, the magnetic flux leakage of the armature 20 can be prevented while reducing the amount of vibration energy to be conducted through the contact area the cover 10 and the armature 20. Also, since the upper side insulator 80 and the lower side insulator 81 each are single component which is provided in a circumferential manner, a number of components required for assembling the motor will be reduced. This will be beneficial particularly when the armature 20 is provided as a single component in an annular manner.

Further, according to FIG. 3, a core side indented portion 24$a$ is provided at a portion, of the outer circumferential surface of core back portion 24, corresponding to the axial direction extending portion 80$b$2 of the upper side insulator 80. Then the axial direction extending portion 80$b$2 is secured to the core side indented portion 24$a$. Now, if a depth of the indented portion of the core side indented portion 24$a$ in the radial direction is greater than the thickness of the axial direction extending portion 80$b$2 in the radial direction, the armature 20 will be forced to make a direct contact with the cover 10. Therefore, the depth of indented portion of the core side indented portion 24$a$ in the radial direction will be set smaller than the thickness of the axial direction extending portion 80$b$2 in the radial direction. Therefore, compared with a situation in which the core side indented portion 24$a$ is not provided, a radial dimension of the gap 90 can be made smaller. Consequently, a radial dimension of the motor can be reduced. Note that the core side indented portion 24$a$ is to be provided in the same manner for the lower side insulator 81.

Finally, according to FIG. 4, a plurality of the axial direction extending portions 80$b$2 having a predetermined distance therebetween are to be provided in the circumferential direction to thereby define a spacer between the upper side insulator 80 and the cylinder portion 12 of the cover 10 and the lower side insulator 81 and the cylinder portion 12 of the cover 10. Due to such configuration, a contact area between the upper side insulator 80 and the cylinder portion 12 of the cover 10, and that between the lower side insulator 81 and the cylinder portion 12 of the cover 10 will be reduced. Therefore, the vibration energy to be conducted to the cover 10 through the upper side insulator 80 will be reduced, wherein the vibration energy is generated due to a reaction of a rotary motion of the field magnet 70 of the armature 20. Also, since the insulator 80 and the spacer includes a material such as resin that allows flexibility, the insulator 80 can absorb the vibration energy of the armature 20. Therefore, the vibration energy generated in the armature 20 will be prevented from being conducted to the cover 10. Consequently, the vibration energy of the entire motor will be reduced.

SECOND EMBODIMENT

Figure 5:
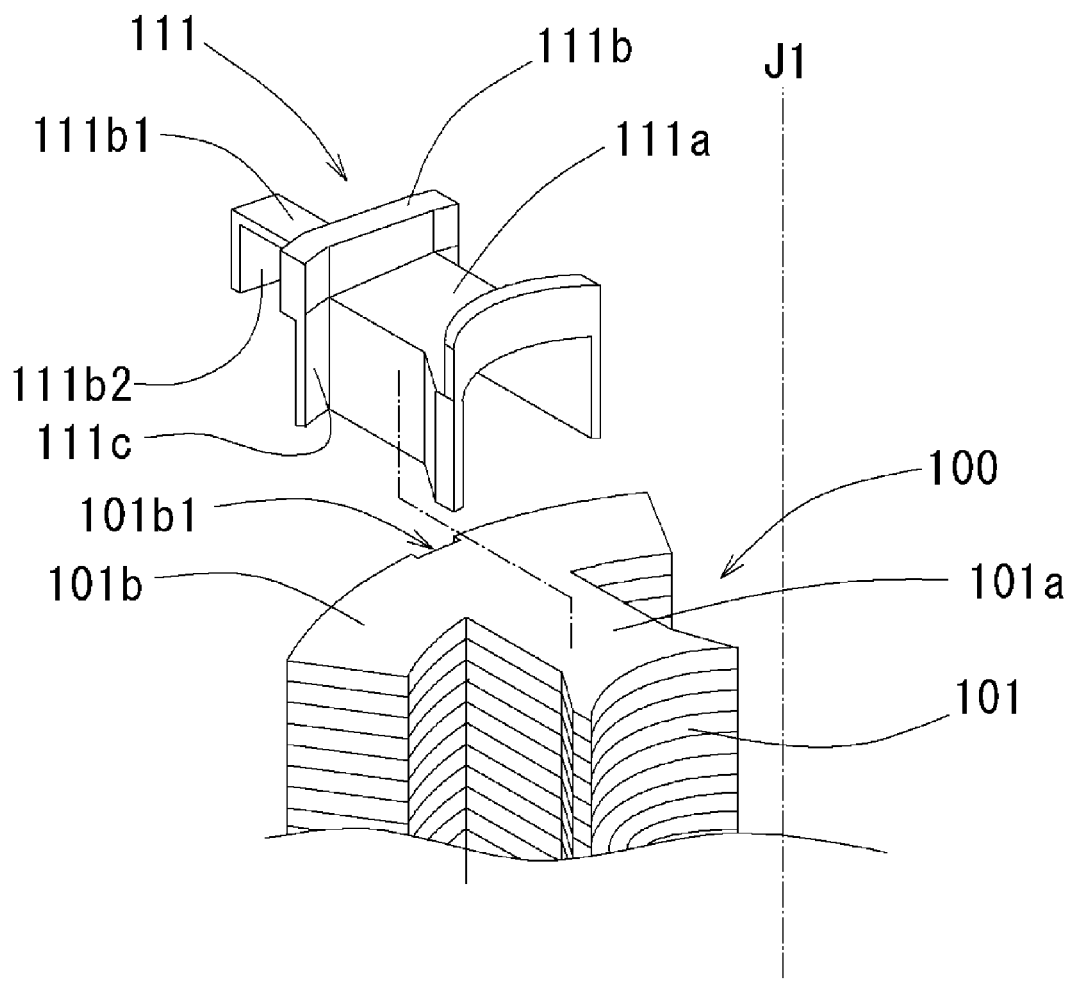
FIG. 5 is a perspective view showing an armature block core having loaded thereon the insulator.
Figure 6:
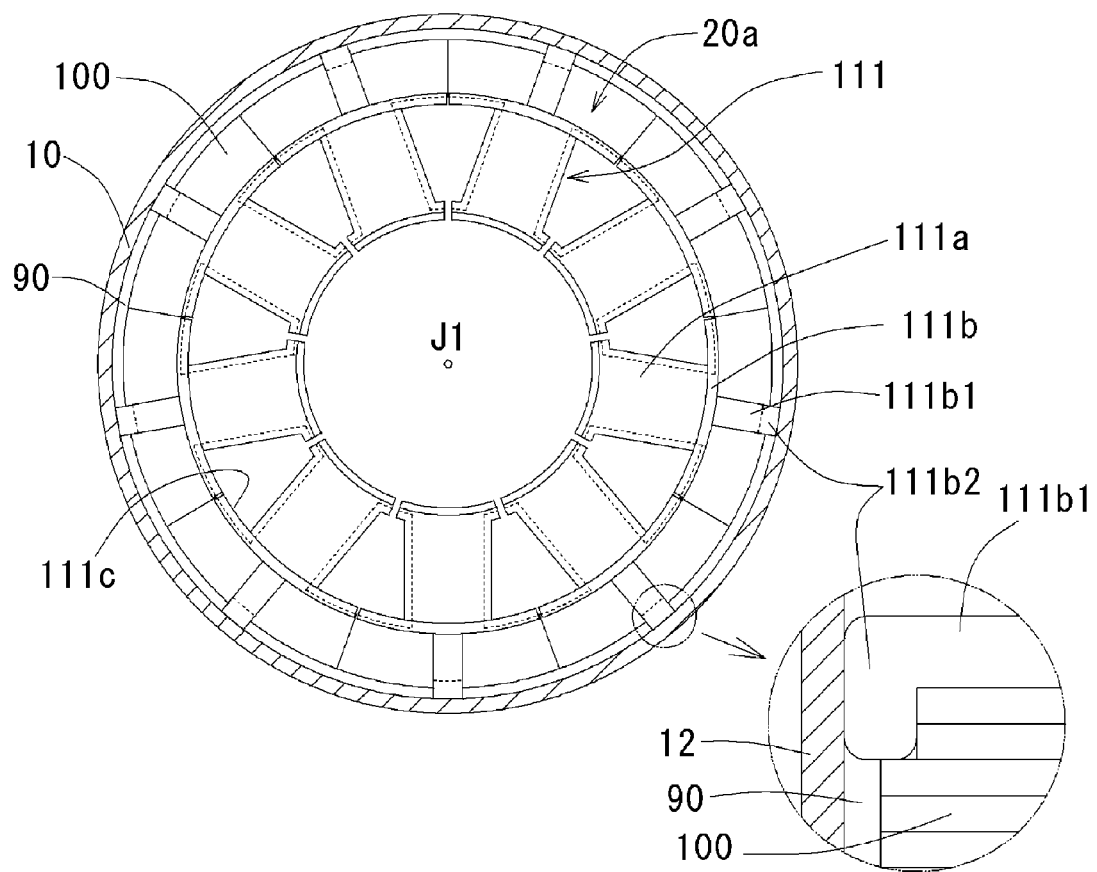
FIG. 6 is a top view showing the armature block core having loaded thereon the insulator.

A second embodiment of the clamping mechanism for the armature 20 and the cover 10 will be described with reference to FIGS. 5 and 6. FIG. 5 is a perspective view showing a top portion of an armature block core 101, which will be described below, and a divided insulator 110 which will be loaded on the armature block core 101. FIG. 6 is a top view showing a plurality of armature block cores 101 which are joined with each other in an annular manner in the circumferential direction, wherein each armature block core 101 has loaded thereon an upper side divided insulator 111, and is affixed to the cover 10. Here, dotted lines indicate the armature block core 101. Further, a window attached to FIG. 6 shows a view of a portion, which is circled by two-dot chain line in FIG. 6, enlarged in the axial direction, and a connection between the upper side divided insulator 111, the armature 20a, and the cover 10.

According to FIG. 5, the armature 20a includes a plurality of armature blocks 100 connected to one another in the annular manner. The armature block 100 includes: the armature block core 101 which is formed by laminating a plurality of thin magnetic steel plates; the upper side divided insulator 111 and a lower side divided insulator (not shown in Fig.) which cover lateral sides of the armature block core 101; and a coil (not shown in Fig.) which coils the outer surface of the upper side divided insulator 111 and the lower side divided insulator. Further, the armature block core 101 includes a divided tooth portion 101a whose tip portion extends toward the central axis J1, and an arc shaped divided core back portion 101b which is located radially outside of the divided tooth portion 101a.

The upper side divided insulator 111 includes: a tooth covering portion 111a which covers the divided tooth portion 101a; a core back top surface covering portion 111b which covers a portion of the inner circumferential side in the radial direction of the top surface of the divided core back portion 101b; and a core back side covering portion 111c which covers the inner circumferential side of the divided core back portion 101b. Further, a radial direction outer side extending portion 111b1 which extends in the radial direction to the outer circumferential edge of the divided core back portion 101b is formed at a portion of the outer circumferential edge in the circumferential direction of the core back upper side covering portion 111b. Further, an axial direction extending portion 111b2 is formed at a portion of the radial direction outer side extending portion 111b1 making a contact with the outer circumferential edge of the divided core back portion 101b. Note that the lower side divided insulator has the same configuration as the upper side counter part. Preferably, from a standpoint of the magnetic flux leakage prevention, the divided insulator 110 is formed of a non-magnetic material in the same manner as the upper side insulator 80 and the lower side insulator 81 as described in the first embodiment. Further, from a standpoint of preventing the vibration energy conduction, the divided insulator 110 is composed of a material allowing elasticity.

Next, according to FIG. 6, the armature 20a includes a plurality of armature blocks 100 connected to one another in the annular manner. Here, the axial direction extending portion 111b2 serves as a spacer, and the cylinder portion 12 of the cover 10 comes into contact with the axial direction extending portion 111b2 thereby securely retaining the armature 20a therein. Further, a plurality of the axial direction extending portions 111b2 having a predetermined distance therebetween are provided in the circumferential direction.

Due to the structure as described above, the gap 90 will be provided between the armature 20a and the cover 10, therefore, the effects (e.g., reduction of the magnetic loss, and the torque loss) of the first embodiment will be achieved. Further, since the plurality of the axial direction extending portions 111b2 having the predetermined distance therebetween are provided in the circumferential direction, the contact area between the cover 10 and the armature 20 is reduced. Therefore, the conduction of the vibration energy from the armature 20 to the cover 10 will be reduced. Further, since each armature block 100 has a corresponding divided insulator 110, none of the plurality of the divided insulators 110 is connected to one another. Therefore, positions of other armature blocks 100 will not interfere with loading the divided insulator 110 for each of the armature 100 and winding the wire around each divided insulator 110. Consequently, productivity of the armature 20a can be increased.

Further, according to FIG. 5, a core side indented portion 101b1 is formed at a portion, on the outer circumferential edge of the divided core back portion 101b, in which the axial direction extending portion 111b2 of the upper side divided insulator 111 and the divided core back portion 101b meet. Due to the core side indented portion 101b, the dimension of the motor in the radial direction can be reduced in the same manner as in the first embodiment.

Figure 7:
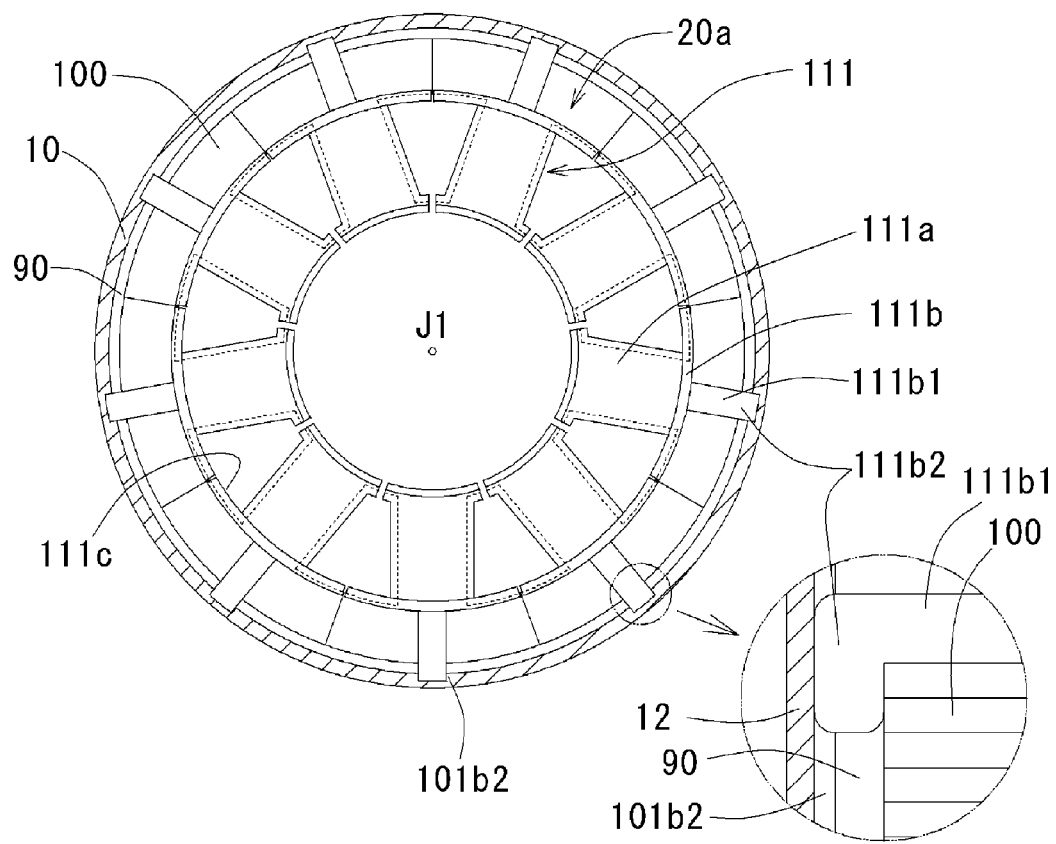
FIG. 7 is a top view showing another embodiment of a relation between an armature and a cover.

Further, although the core side indented portion 101b is provided on the side of the armature 20 in the second embodiment, this is not limited thereto; a cover side indented portion 101b2 can be provided instead of the core side indented portion 101b1 as shown in FIG. 7, or the cover side indented portion 101b2 can be provided as well as the core side indented portion 101b1.

Figure 8A:
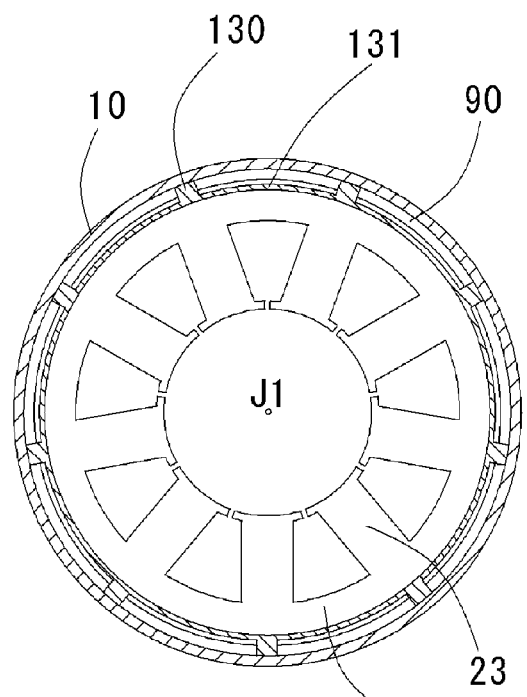
FIG. 8A is a top view showing the armature core having loaded thereon an anti-vibration member.
Figure 8B:
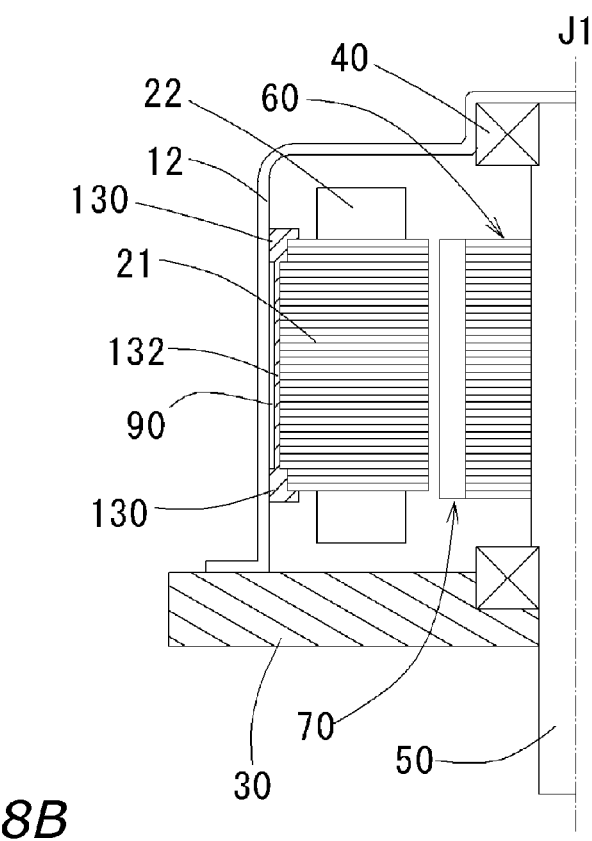
FIG. 8B is a half of a cross sectional view along the axial direction showing the armature core having loaded thereon the anti-vibration member.

Further, the axial direction extending portion 111b2 can be formed as a spacer 130 which is an independent member. When the axial direction extending portion 111b2 is formed as the spacer 130, an insulation coating can be applied to the portion covered by the upper side divided insulator 111 so as to insulate the armature 20 instead of using the insulator for the armature 20a. As for a shape of the spacer 130, the spacer 130, as shown in FIG. 8A, includes a circumferential direction connecting portion 131 which forms a gap between the cover 10 and a gap between the bracket 30, wherein the spacer 130 and the circumferential direction connecting portion 131 are integrally formed. When the spacer 130 and the circumferential direction connecting portion 131 are integrally formed, a number of parts required for the assembly of the motor can be reduced. Further, the circumferential direction connecting portion 131 can be in any shape as long as the cover 10 and the bracket 30 are prevented from coming into contact with each other. Further, as shown in FIG. 8B, the spacer 130 includes an axial direction connecting portion 132 which forms a gap between the cover 10 and a gap between the bracket 30, wherein the spacer 130 and the axial direction connecting portion 132 are integrally formed. When the spacer 130 and the axial direction connecting portion 132 are integrally formed, a number of parts required for the assembly of the motor can be reduced in the same manner as in the first embodiment. Note that the aforementioned configuration is applied to the lower side divided insulator. Preferably, from a standpoint of the magnetic flux leakage prevention, the spacer 130 is formed of a non-magnetic material. Further, from a standpoint of preventing the vibration energy conduction, the spacer 130 is composed of materials allowing elasticity.

THIRD EMBODIMENT

Figure 9:
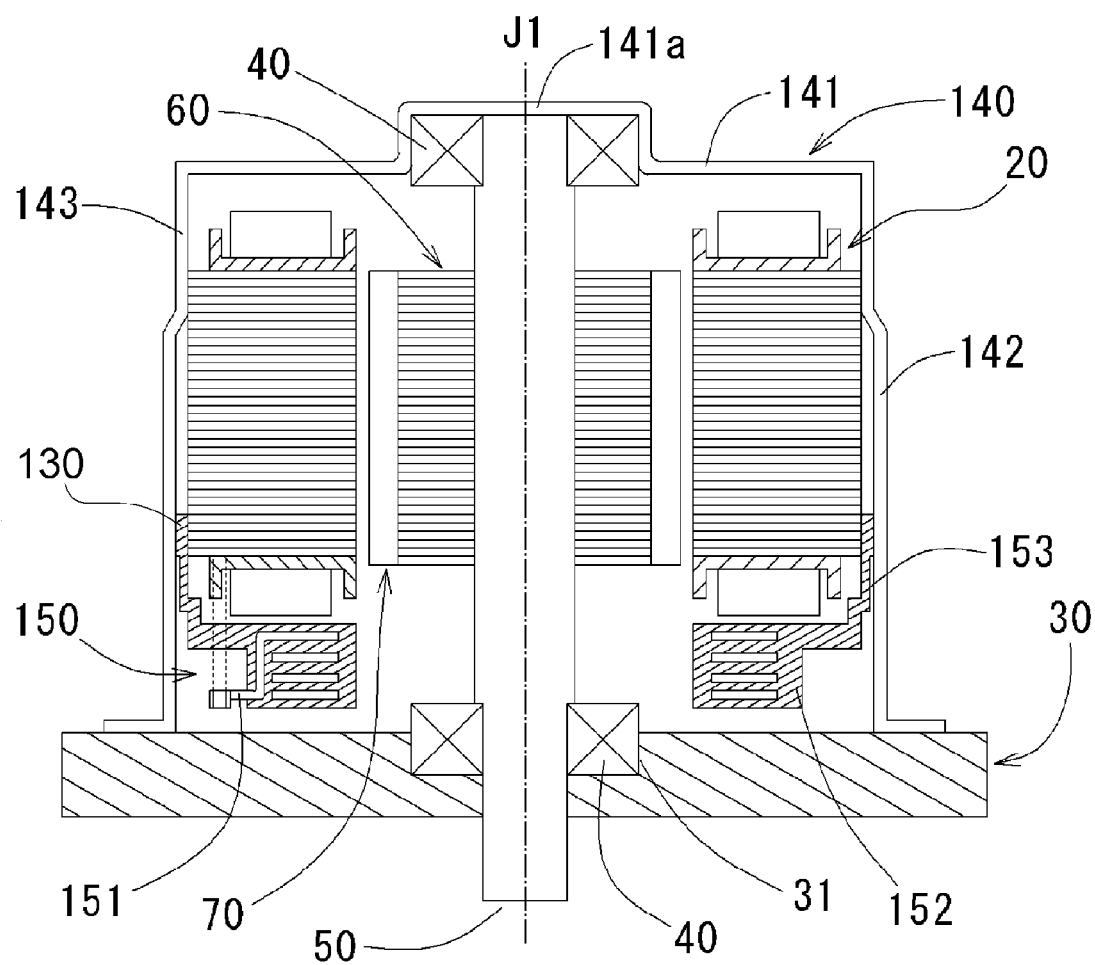
FIG. 9 is a cross sectional view along the axial direction of an embodiment of a motor according to the present invention.

A clamping mechanism for the armature and the cover according to the present invention will be described with reference to FIG. 9. FIG. 9 is a schematic cross section view of the motor in the axial direction. Note that in FIG. 9, elements similar to those illustrated in FIG. 1 are denoted by similar reference numerals, and description thereof is omitted. Also, description herein will be made mainly on a cover 140 which is different from the cover 10 shown in the FIG. 1, and a connection mechanism 150.

The cover 140 has a cylindrical shape having an opening at a bottom portion thereof. The cover 140 is formed by applying a process such as pressing on an iron base material. At the center of a bottom portion 141 of the cover 140, an upper side indented portion 141a which faces upward is provided. Further, an armature 20 is located at an inner circumferential side of a cylinder portion 142 of the cover 140. Further, a radial direction reduced portion 143 having a smaller outer diameter than that of the cylinder portion 142 is formed at the axially upper side of the cylinder portion 142. The inner circumferential surface of the radial direction reduced portion 143 is joined to the outer circumferential surface of the armature 20. By this, the gap 90 will be formed between the armature 20 and the cylinder portion 142. Further, since the radial direction reduced portion 143 and the armature 20 are affixed to each other by a clearance fit, concentricity of the armature 20 and the cylinder portion 142 will be improved. As a result, the concentricity between a shaft 50 which is affixed to the cover 140 via the ball bearing 40 and the armature 20 can also be improved. Due to the structure as described above, an even space between an outer circumferential surface of the field magnet 70 which is affixed to the shaft 50 and the armature 20 can be generated, thereby maintaining a stabilized magnetic flux in the circumferential direction. This will reduce the vibration energy of the armature 20. Although the armature 20 and the cover 140 are joined together by the clearance fit in the present embodiment, the joining method is not limited thereto; press fit, shrink fit, or the like can be used.

The connection mechanism 150 located at a lower side of the armature 20 includes: a conductor 151 which connects end portions of the wound wire 22 of the armature 20; a retaining case 152 for retaining the conductor 151; and an armature contact portion 153, which makes contact with the armature so as to determine a position of the connection mechanism. Also, the conductor 151 can be molded to the retaining case 152. Note that the retaining case 152 is an insulator since the conductor 151 is contained therein. Further, the retaining case 152 is formed of a non-magnetic material such as resin, or the like.

Further, a plurality of armature contact portions 153 having a predetermined distance therebetween in the circumferential direction are formed. The armature contact portions 153 are secured to the outer circumferential surface of the armature 20 and upper portions 130 of the armature contact portions 153 serve as spacers between the armature 20 and the cover 140. Further, the outer circumferential surface of the armature contact portion 153 makes contact with the inner circumferential surface of the cylinder 142. By this, the armature 20 and the cover 140 are retained at a predetermined distance from one another. Since the plurality of armature contact portions 153 having the predetermined distance therebetween are provided in the circumferential direction are formed, a contact area between the cover 140 and the armature contact portions 153 is reduced. Therefore, the conduction of the vibration energy from the armature 20 to the cover 140 will be reduced.

The connection mechanism 150 can be secured by providing the core side indented portion 24a on the outer circumferential edge of the armature 20. When the indented portion 24a is provided on the outer circumferential edge of the armature 20, and when the armature contact portion 153 makes contact with the core side indented portion 24a, the connection mechanism 150 will be prevented from moving in the circumferential direction. Further, when a leveled portion is provided on the core side indented portion 24a in the axial direction, or when the leveled portion is provided on the armature contact portion 153, a position of the connection mechanism 150 with respect to the axial direction can be determined efficiently.

Further, although according to the third embodiment the armature 20 which is an annularly shaped armature is used, this is not limited thereto. The armature 20a which is a plurality of armature blocks 100 connected in the annular manner can be used.

Further, the configuration of the above-described cover 140 according to the third embodiment can be applied to the first and the second embodiment of the present invention. When the configuration of the cover 140 according to the third embodiment is used in the first or the second embodiment, the lower side insulator 81 and the axial direction extending portion which is formed on the lower side divided insulator will not be provided. When the configuration of the cover 140 according to the third embodiment is used in the first or the second embodiment, the concentricity of the cover and the armature 20, and the armature 20a will be improved.

Entire Structure of the Motor: Outer Rotor Type

Figure 10:
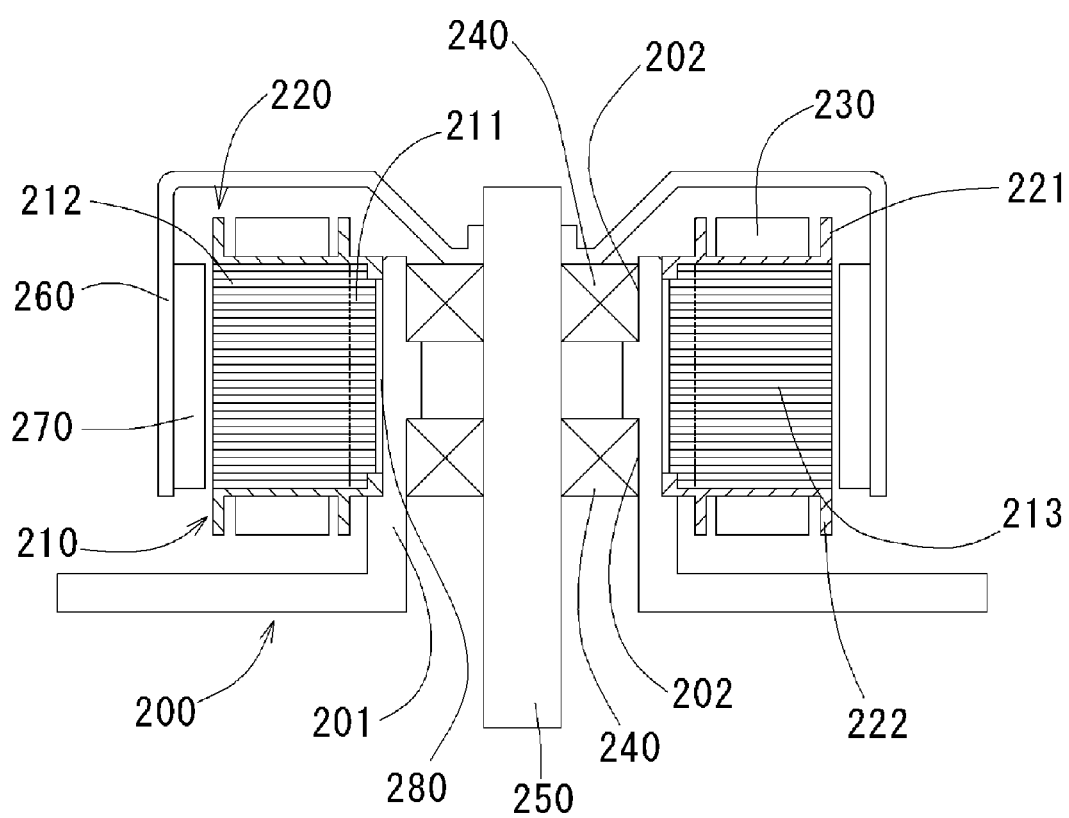
FIG. 10 is a cross sectional view along the axial direction of another embodiment of a motor according to the present invention.
Figure 11:
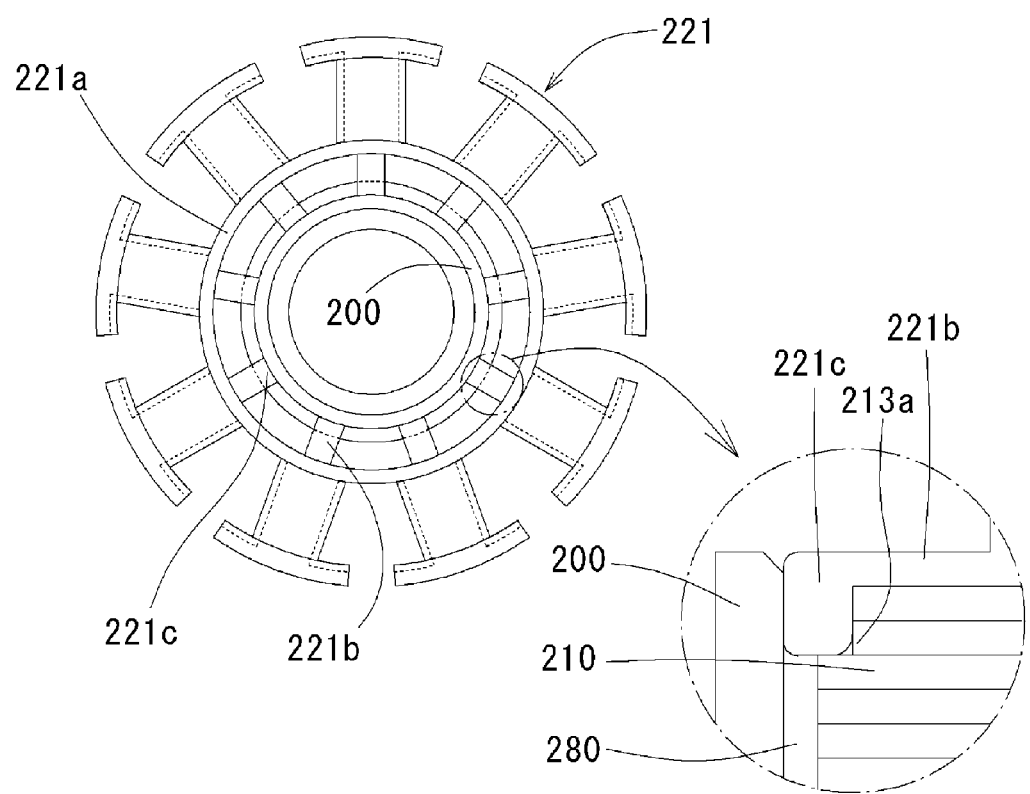
FIG. 11 is a top view showing an armature core of the motor shown in FIG. 9 having loaded thereon an insulator.

An embodiment of an entire structure of a motor according to the present invention will be described with reference to FIGS. 10 and 11. FIG. 10 is a schematic cross section of the motor in the axial direction. FIG. 11 is a top view of an armature core 213 which will be described below having loaded thereon an upper side insulator 221 which will be described below. Here, dotted lines show the armature core 213. Also, a window attached to FIG. 11 is a view of a portion, which is circled by two-dot chain line, enlarged in the axial direction showing how the armature core 213 and a bearing retainer 212 which will be described below are attached to each other.

According to FIG. 10, a bearing retainer 200 has a cylindrical shape, and has on an outer circumferential side thereof an armature 210. The armature 210 includes: an armature core 213 wherein a plurality of teeth portions 212 extend in the radial direction from an outer circumferential surface of the annular core back portion 211; an insulator 220 which covers an inner circumferential surface, an outer circumferential surface of end surfaces in the axial direction of the core back portion 211, and all surfaces except for the top and the outer circumferential surfaces of each tooth portion 212 so as to insulate them; and a coil 230 winding around the outer circumferential surface of the insulator 220.

Further, the insulator 220 includes an upper side insulator 221 which covers the armature core 213 from the top side of the armature 213, and a lower side insulator 222 which covers the armature core 213 from the bottom side of the armature 213.

A radial direction expanding portion 202 is provided at a top and bottom ends of the inner circumferential surface of the cylinder portion 201 in the bearing retainer 200. A ball bearing 240 which is a bearing portion is affixed to the radial direction expanding portion 202.

A shaft 250 which rotates around the same axis as the rotary axis is secured to an inner circumferential surface of a ball bearing 240 such that the shaft 250 is supported and allowed to rotate freely. Also, a rotary holder 260 which is a magnetic member having a cylindrical shape including therein a bottom portion which configures a top surface is secured at a top end portion of the shaft 250. At an inner circumferential side of the cylinder portion 261 of the rotor holder 260, a field magnet 270 is located such that the field magnet 270 is opposed to an outer circumferential surface of the tooth portion 212 of the armature 210 wherein there is a gap between the field magnet 270 and the outer circumferential surface of the tooth portion 212. Hereinafter, the structure having therein the shaft 250, the rotor holder 260 and the field magnet 270 will be referred to a rotor section. A structure of the rotor section, however, is not limited thereto; the rotor section may include any component which rotates with respect to a predetermined axis.

When an electric current is applied to the armature 210, a magnetic field is generated around the armature 210 thereby generating, due to the interaction between the generated magnetic field and the field magnet 270, rotary torque centering the central axis.

Clamping Mechanism for Armature and Bearing Retainer

According to FIG. 11, a radial direction extending portion 221b which extends inward in the radial direction is provided on the outer circumferential edge of the core back upper side cover portion 221a which covers surfaces in the axial direction of the core back portion 211 of the upper side insulator 221. A core side indented portion 213a is formed on a portion of an outer circumferential edge, of the core back portion 211, corresponding to the axial direction extending portion 221c. By this, the insulator 220 can be securely affixed between the bearing retainer 200 and the armature 210 after radial dimension of the armature 210 is enlarged. By this, a gap 280 will be generated between the bearing retainer 200 and the armature 210, thereby preventing magnetic flux leakage to the bearing retainer 200 from the armature 210 can be prevented.

Further, according to FIG. 10, a plurality of the axial direction extending portions 221c serve as spacers, and have predetermined distance therebetween formed in the circumferential direction. By this, since the contact area between the armature 210 and the bearing retainer 200 is reduced as described above, the vibration conducted from the armature 210 to the bearing retainer 200 will be reduced. Note that the aforementioned configuration is to be applied also to the lower side insulator 222.

Figure 12:
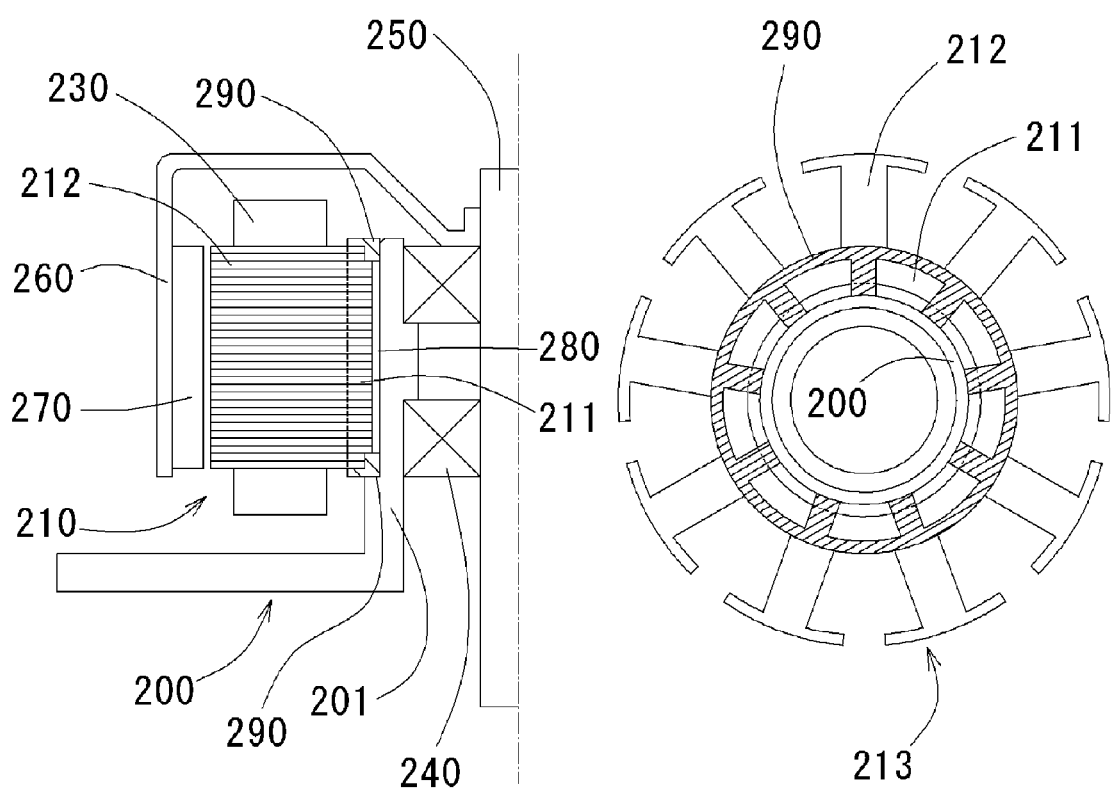
FIG. 12 is a top view showing an armature core having loaded thereon an anti-vibration member.

Although the description above states that the axial direction extending portion 221a is integrally formed with the insulator 220, this is not limited thereto. The axial direction extending portion 221c can be located as a spacer 290 as shown in FIG. 12.

Also, although the ball bearing 240 which is the sliding bearing is used for the bearing portion in the present embodiment, this is not limited thereto. A component capable of supporting the rotor section in a manner such that the rotor section is supported and allowed to rotate freely, such as sintered material impregnated with oil which is a bearing for the sliding bearing, can be used for the bearing portion in the present invention.

Also, it is described in the forgoing embodiment that the cylinder portion 12 is formed in the cover 10, this is not limited thereto. The cylinder portion 12 can be in any shape if the portion can secure therein the armature 20. For example, the cylinder portion 12 can have any shape such as, as seen from the above, a polygonal shape having more angles than triangle.

What is claimed is:

1. A brushless motor comprising:
   an armature including an annular core back having a substantially cylindrically shaped outer circumferential surface which extends along a central axis, a plurality of teeth each extending from the core back toward the central axis and having an end surface facing the central axis, and a coil formed by winding a conducting wire around each tooth;
   a cover including a cylinder portion whose inner diameter is greater than an outer diameter of the annular core back, and for covering the armature from radially outside thereof;
   a plurality of spacers each having a surface making contact with the outer circumferential surface of the annular core back and a surface making contact with an inner circumferential surface of the cylinder portion;
   a rotor, located radially nearer to the central axis than the tooth of the armature, for generating, due to an interaction between the tooth and rotor, a rotary drive force; and
   a bearing portion for supporting the rotor in such a manner that the rotor is allowed to rotate freely.

2. The brushless motor according to claim 1, wherein:
   the plurality of spacers each include a circumferential direction connecting portion, the circumferential direction connecting portion connects the plurality of spacers; and
   the circumferential direction connecting portion generates a gap between an outer surface thereof and the inner circumferential surface of the cylinder portion.

3. The brushless motor according to claim 1, wherein at least one of the plurality of spacers is located at a position, with respect to an axial direction, different from a position the rest of the spacers are located.

4. The brushless motor according to claim 3, wherein the axial direction connecting portion for connecting the spacers located at different positions with respect to the axial direction is provided so as to maintain a predetermined distance between each spacer.

5. The brushless motor according to claim 1, wherein:
   the armature further includes an insulator, made of an insulating material, for covering at least the plurality of teeth;
   the coil is formed by winding the conducting wire around each tooth; and
   the spacer and the insulator are integral with each other.

6. The brushless motor according to claim 1, wherein:
   a connection mechanism thereof includes a conductor located at one end of the armature in an axial direction for connecting end portions of the coil, and an armature contact portion for retaining the conductor and making contact with the armature so as to determine a position thereof in the axial direction; and
   the spacer and the armature contact portion are integral with each other.

7. The brushless motor according to claim 1, wherein:
   the core back includes a core side indented portion located at a portion, on the outer circumferential surface of the core back, corresponding to each spacer; and a portion of each spacer is contained in the core side indented portion.

8. The brushless motor according to claim 5, wherein:
   the core back includes a core side indented portion located at a portion, on the outer circumferential surface of the core back, corresponding to each spacer; and a portion of each spacer is contained in the core side indented portion.

9. The brushless motor according to claim 6, wherein:
the core back includes a core side indented portion located at a portion, on the outer circumferential surface of the core back, corresponding to each spacer; and a portion of each spacer is contained in the core side indented portion.

10. The brushless motor according to claim 1, wherein:
a cover side indented portion is provided at a portion, of the inner circumferential surface of the cylinder portion, corresponding to each spacer; and
a portion of each spacer is contained in the cover side indented portion.

11. The brushless motor according to claim 1, wherein the spacer is made of a non-magnetic material.

12. The brushless motor according to claim 1, wherein the spacer is made of a resin material.

13. The brushless motor according to claim 1, wherein the cover is made of a magnetic material.

14. The brushless motor according to claim 1, wherein the cover includes a radial direction reduced portion, connected to one axial end of the cylinder portion, an inner circumferential surface thereof arranged to contact with the outer circumferential surface of the core back.

15. The brushless motor according to claim 14, wherein the radial direction reduced portion is arranged to extend continuously in a circumferential direction of the cover.

16. The brushless motor according to claim 1, wherein the core back includes a plurality of cores divided in a circumferential direction.

17. The brushless motor according to claim 5, wherein the core back includes a plurality of cores divided in a circumferential direction.

18. The brushless motor according to claim 6, wherein the core back includes a plurality of cores divided in a circumferential direction.

19. The brushless motor according to claim 1, wherein
the plurality of spacers are each provided on a portion of the outer circumferential surface of the core back.

20. The brushless motor according to claim 19, wherein:
a cover side indented portion is provided at a portion, of the inner circumferential surface of the cylinder portion, corresponding to the spacer provided on the inner circumferential surface of the cylinder portion; and a portion of each spacer is contained in the cover side indented portion.

21. A brushless motor comprising:
an armature including an annular core back having a substantially cylindrical shaped outer circumferential surface which extends along a central axis, a plurality of teeth each extending from the core back toward the central axis and having an end surface facing the central axis, and a coil formed by winding a conducting wire around each tooth;
a cover including a cylinder portion whose inner diameter is greater than an outer diameter of the annular core back for covering the armature from radially outside thereof, and a radial direction reduced portion, connectedly provided to one axial end of the cylinder portion, an inner circumferential surface thereof making contact with the outer circumferential surface of the core back;
a rotor, located radially nearer to the central axis than the tooth of the armature, for generating, due to an interaction between the tooth and rotor, a rotary drive force;
a bearing portion for supporting the rotor in such a manner that the rotor is allowed to rotate freely;
a plurality of armature contact portions located in a circumferential direction and having a predetermined distance therebetween; upper portions of the plurality of armature contact portions defining a spacer having a surface in contact with the outer circumferential surface of the core back and a surface in contact with an inner circumferential surface of the cylinder portion; and
a connection mechanism having a conductor located at one end of the armature in the axial direction, the conductor arranged to connect end portions of the coil; wherein
the armature contact portions retain the conductor to determine a position of the connection mechanism with respect to the axial direction.

22. The brushless motor according to claim 21, wherein the radial direction reduced portion is formed continuously in a circumferential direction of the cover.

23. A brushless motor comprising:
an armature including an annular core back having a substantially cylindrically shaped outer circumferential surface which extends along a central axis, a plurality of teeth each extending from the core back toward the central axis and having an end surface facing the central axis, and a coil defined by a conducting wire wound around each tooth;
a cover including a cylinder portion having an inner diameter that is greater than an outer diameter of the annular core back, and arranged to cover the armature from radially outside thereof;
a plurality of spacers each having a surface in contact with the outer circumferential surface of the annular core back and a surface in contact with an inner circumferential surface of the cylinder portion;
a rotor, located radially nearer to the central axis than the tooth of the armature, to generate a rotary drive force produced by an interaction between the tooth and rotor;
a bearing portion arranged to support the rotor in such a manner that the rotor is allowed to rotate freely;
a plurality of armature contact portions located in a circumferential direction and having a predetermined distance therebetween; upper portions of the plurality of armature contact portions defining a spacer having a surface in contact with the outer circumferential surface of the core back and a surface in contact with the inner circumferential surface of the cylinder portion; and
a connection mechanism having a conductor located at one end of the armature in the axial direction, the conductor arranged to connect end portions of the coil; wherein
the armature contact portions retain the conductor to determine a position of the connection mechanism with respect to the axial direction.

24. The brushless motor according to claim 23, wherein:
the core back includes a core side indented portion located at a portion, on the outer circumferential surface of the core back, corresponding to each spacer; and
a portion of each spacer is contained in the core side indented portion.

25. The brushless motor according to claim 23, wherein:
the armature further includes an insulator formed of an insulating material covering at least the plurality of teeth around which the conducting wire is wound so as to form the coil; and
the spacers and the insulator are integrally formed.

26. The brushless motor according to claim 1, wherein:
a connection mechanism thereof includes a conductor located at one end of the armature in the axial direction for connecting end portions of the coil, and an armature contact portion for retaining the conductor and making contact with the armature so as to determine a position thereof with respect to the axial direction; and the spacer and the armature contact portion are integral with each other.

27. The brushless motor according to claim 23, wherein the armature contact portions and the spacers are made of a resin material.

28. The brushless motor according to claim 26, wherein the armature contact portions and the spacers are made of a resin material.

29. The brushless motor according to claim 23, wherein the cover is made of a magnetic material.

30. The brushless motor according to claim 29, wherein the cover is made of a pressed magnetic steel plate.

31. The brushless motor according to claim 23, wherein each spacer includes a circumferential direction connecting portion for connecting one spacer to another spacer to maintain the predetermined distance between each spacer and to provide a gap between the inner circumferential surface of the cylinder portion and each spacer.

* * * * *

UNITED STATES PATENT AND TRADEMARK OFFICE
CERTIFICATE OF CORRECTION

PATENT NO.       : 7,608,959 B2                                             Page 1 of 1
APPLICATION NO.  : 11/551239
DATED            : October 27, 2009
INVENTOR(S)      : Kataoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

Twelfth Day of October, 2010

David J. Kappos
*Director of the United States Patent and Trademark Office*